No. 854,902. PATENTED MAY 28, 1907.
F. L. McNITT.
DRINKING FOUNTAIN.
APPLICATION FILED NOV. 19, 1906.

Witnesses
L. B. James
C. H. Griestauer

Inventor
Fred L. McNitt
by H. B. Willson & Co
Attorneys

UNITED STATES PATENT OFFICE.

FRED L. McNITT, OF CALIFORNIA, MICHIGAN.

DRINKING-FOUNTAIN.

No. 854,902. Specification of Letters Patent. Patented May 28, 1907.

Application filed November 19, 1906. Serial No. 344,176.

*To all whom it may concern:*

Be it known that I, FRED L. McNITT, a citizen of the United States, residing at California, in the county of Branch and State of Michigan, have invented certain new and useful Improvements in Drinking-Fountains; and I do declare the following to be a full, clear, and exact description of the invention, such as will enable others skilled in the art to which it appertains to make and use the same.

This invention relates to improvements in drinking fountains for poultry.

The object of the invention is to provide a device of this character having means whereby the water in the fountain will be prevented from freezing in cold weather, and means whereby the wattles of the fowls will be prevented from being wet when the fowl drinks.

A further object is to provide a drinking fountain of this character which will be simple, strong and durable in construction, efficient in operation and well adapted to the purpose for which it is designed.

With the above and other objects in view, the invention consists of certain novel features of construction, combination and arrangement of parts, as will be hereinafter described and claimed.

Figure 1:
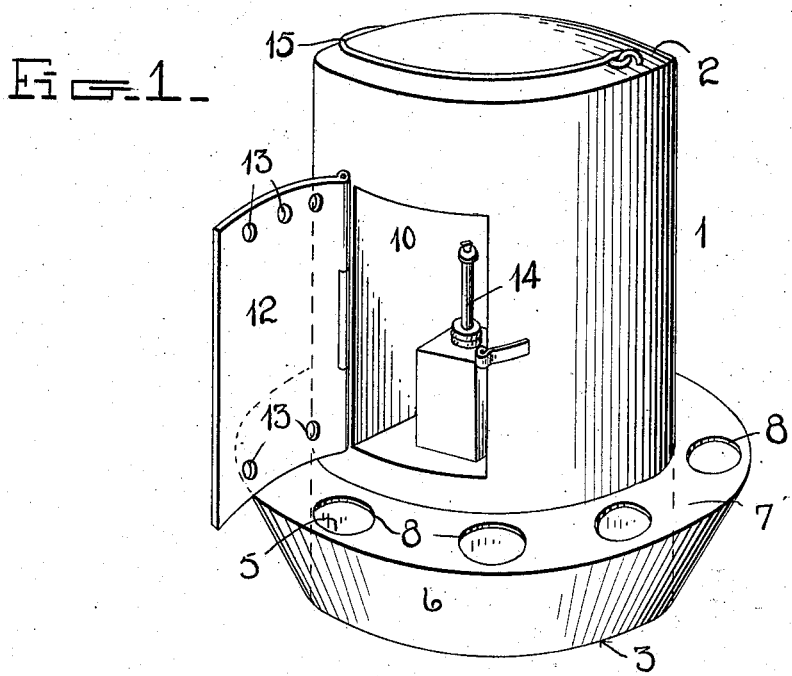
Figure 2:
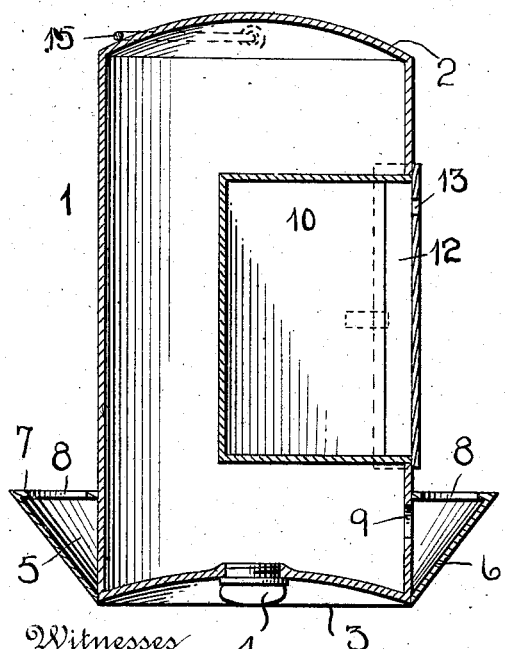
Figure 3:
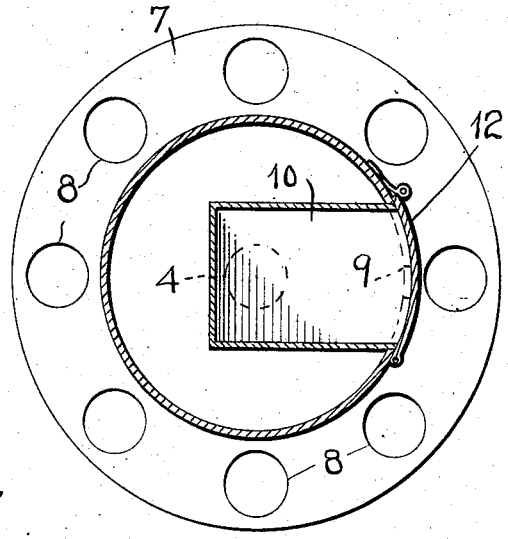

In the accompanying drawings:—Figure 1 is a perspective view of a drinking fountain constructed in accordance with the invention; Fig. 2 is a vertical sectional view of the same; and Fig. 3 is a horizontal sectional view, taken through the lamp compartment of the fountain.

Referring more particularly to the drawings, 1 denotes a tank or receptacle of the fountain, which is here shown and preferably consists of a cylindrical can having a closed upper end 2 and a lower end 3, in which is arranged a filling opening adapted to be closed by a screw plug 4.

Arranged around the lower end of the tank 1 is a saucer or water receptacle 5 having an upwardly and outwardly inclined side wall 6. Between the upper edge of the saucer 5 and the adjacent side wall of the tank 1 is arranged a cover plate 7, in which is formed a series of drinking apertures 8. Through the apertures 8 the fowls may reach the water contained in the saucer or receptacle 5, said water being supplied thereto from the tank 1 through a suitable discharge aperture 9 formed in the wall of the tank 1 adjacent to the top of the saucer or receptacle 5. The water is held in the saucer by the pressure of the outside air, which is greater than that within the tank 1.

Arranged in the tank 1 is a compartment lamp 10, wholly free from communication with the tank which is here shown as preferably rectangular in shape, and is adapted to be closed by a door 12, said door being provided near its upper and lower ends with ventilating apertures 13, by means of which air is supplied to a gasolene lamp 14 adapted to be placed in the compartment 10 to prevent the water in the tank 1 from freezing in cold weather. If desired the tank 1 may be provided on its upper end with a bail or handle 15, by means of which the device may be carried from one place to another.

By providing a drinking fountain constructed as herein shown and described having a compartment adapted to contain a lamp or other heating device, the water in the tank will be prevented from freezing in cold weather and by providing the saucer or drinking receptacle with a cover plate having formed thereon a series of drinking openings, the wattles of the fowls will be prevented from being wet, thus decreasing the danger of the wattles being frozen.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined by the appended claims.

Having thus described my invention, what I claim as new and desire to secure by Letters-Patent, is:—

A drinking fountain for poultry comprising a tank provided at its lower end with a saucer having a cover containing a plurality of drinking openings, the wall of the tank being provided with an opening through which water flows from the tank to the saucer, a lamp compartment formed within the tank and wholly free from communication with the latter, said compartment having a door-way formed in the side wall of the tank, a heating lamp arranged in the compartment and a door for closing said door-way.

In testimony whereof I have hereunto set my hand in presence of two subscribing witnesses.

FRED L. McNITT.

Witnesses:
 GEO. E. TERPENING,
 ERNEST D. FRANK.